United States Patent Office 3,266,555
Patented August 16, 1966

3,266,555
ROTATING COIL DISTRIBUTOR-CONVEYOR FOR CYLINDRICAL FILM EVAPORATOR
Bernd Thier, Marl, Germany, assignor to Chemische Werke Huls Aktiengesellschaft, Marl, Germany, a corporation of Germany
Filed Aug. 26, 1963, Ser. No. 304,362
Claims priority, application Germany, Sept. 5, 1962, C 27,857
5 Claims. (Cl. 159—6)

When compounds of high molecular weight are being distilled and rectified thin-layer vaporizers will guarantee the protection of thermally sensitive products. By producing thin films of fluid at the heat exchange surfaces a low total volume is involved and a brief staying time results.

Since it is necessary to spread the film uniformly and to produce continuously new layers of fluid, thin-layer vaporizers have been developed where the film is produced by means of mechanical devices such as wipers, brushes, slanting toothed strips, rollers and the like.

During rectification the production of thin layers of fluid is likewise advantageous because an extensive exchange between the liquid and vapor will increase the effectiveness of the column and because a thin layer will prevent to a large extent the carrying off of small fluid droplets. Material and heat exchange require, by necessity, large surfaces (filter beds, trickling foils etc.) which however must not cause excessive pressure losses in the column because many compounds of high molecular weight will not tolerate thermal loads.

The known rotating thin-layer vaporizers with mechanically produced film have only a poor rectifying efficiency because they lack the necessary heat transfer surfaces. Rotating columns for rectification purposes where the film of fluid is produced by mechanical means are not known.

It has been found that it is possible to attain the formation of an excellent film and good heat exchange results by a rotating distributor, delivery and exchange apparatus for thin-layer vaporizers comprising a spiral rotor formed by a supporting coil spring and a second thinner coil spring shrouding the first-mentioned spring.

Figure 1:
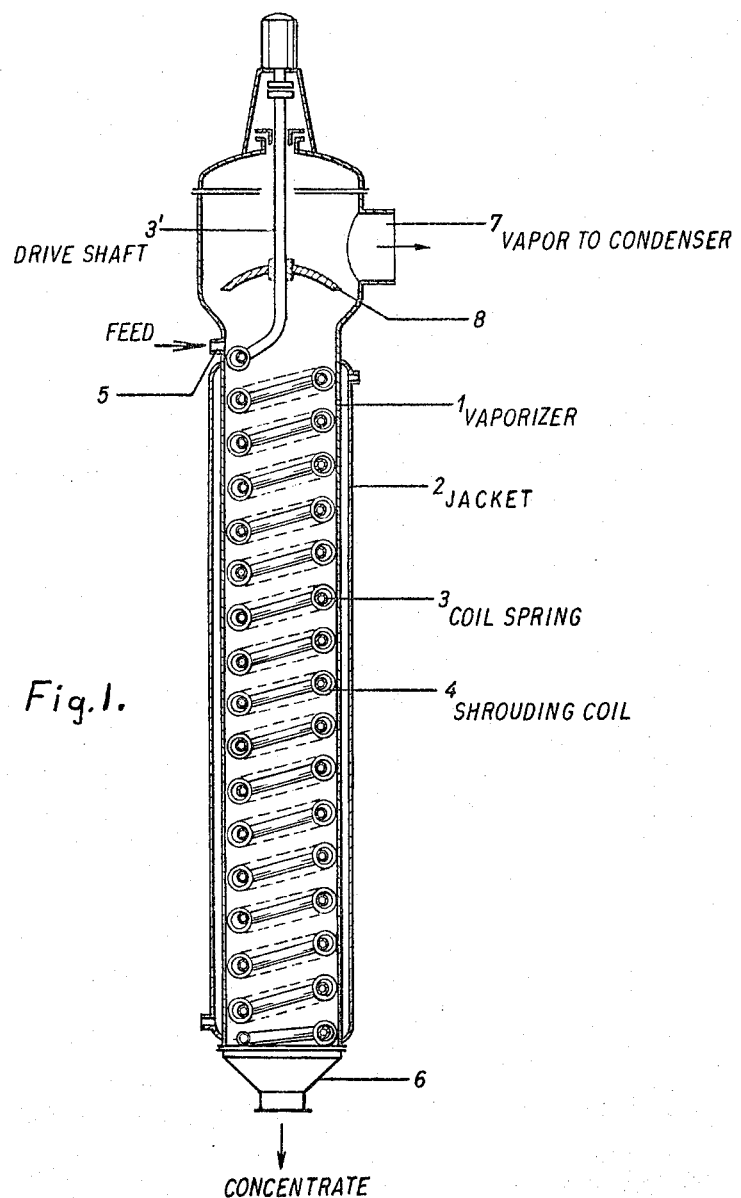
Figure 2:
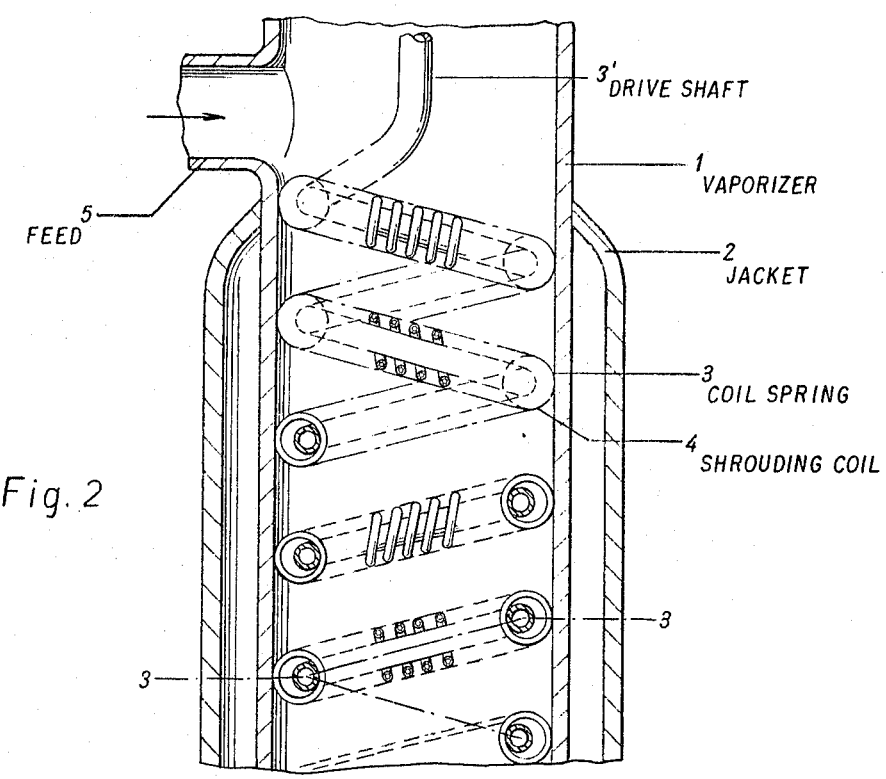
Figure 3:
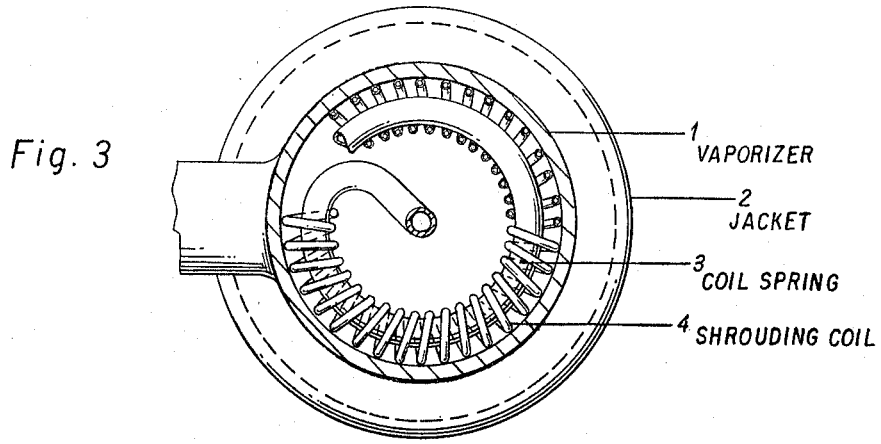
Figure 4:
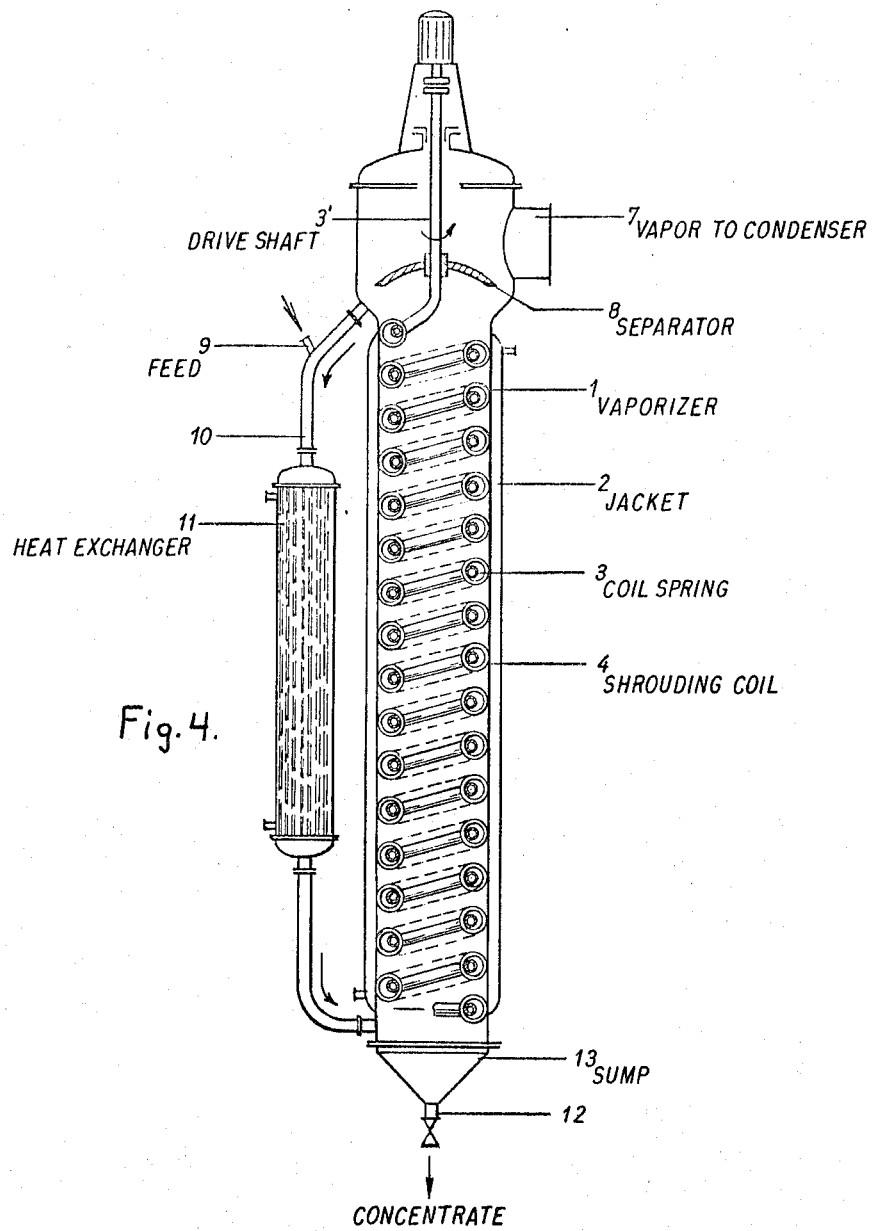
Figure 5:
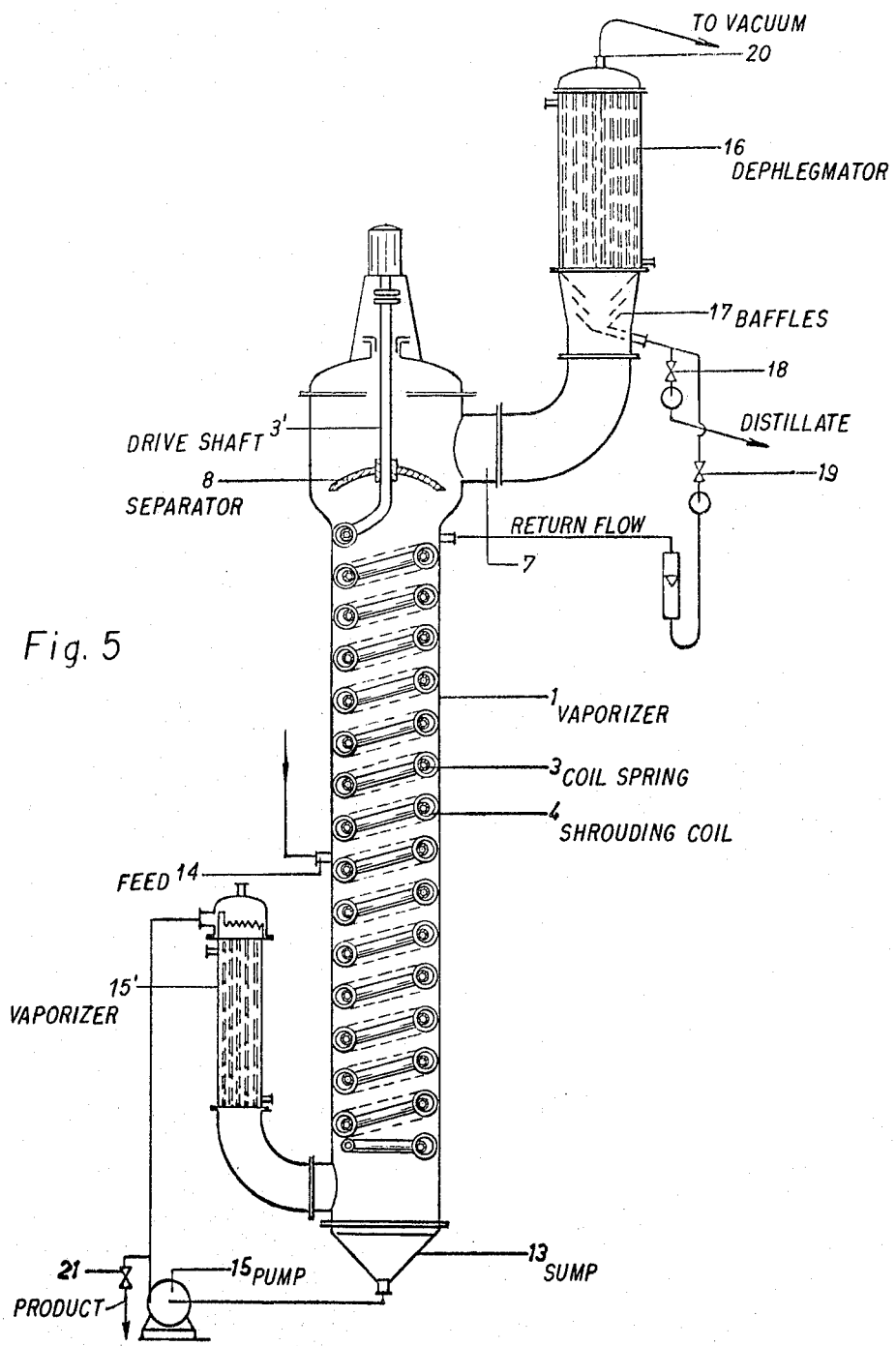
Figure 6:
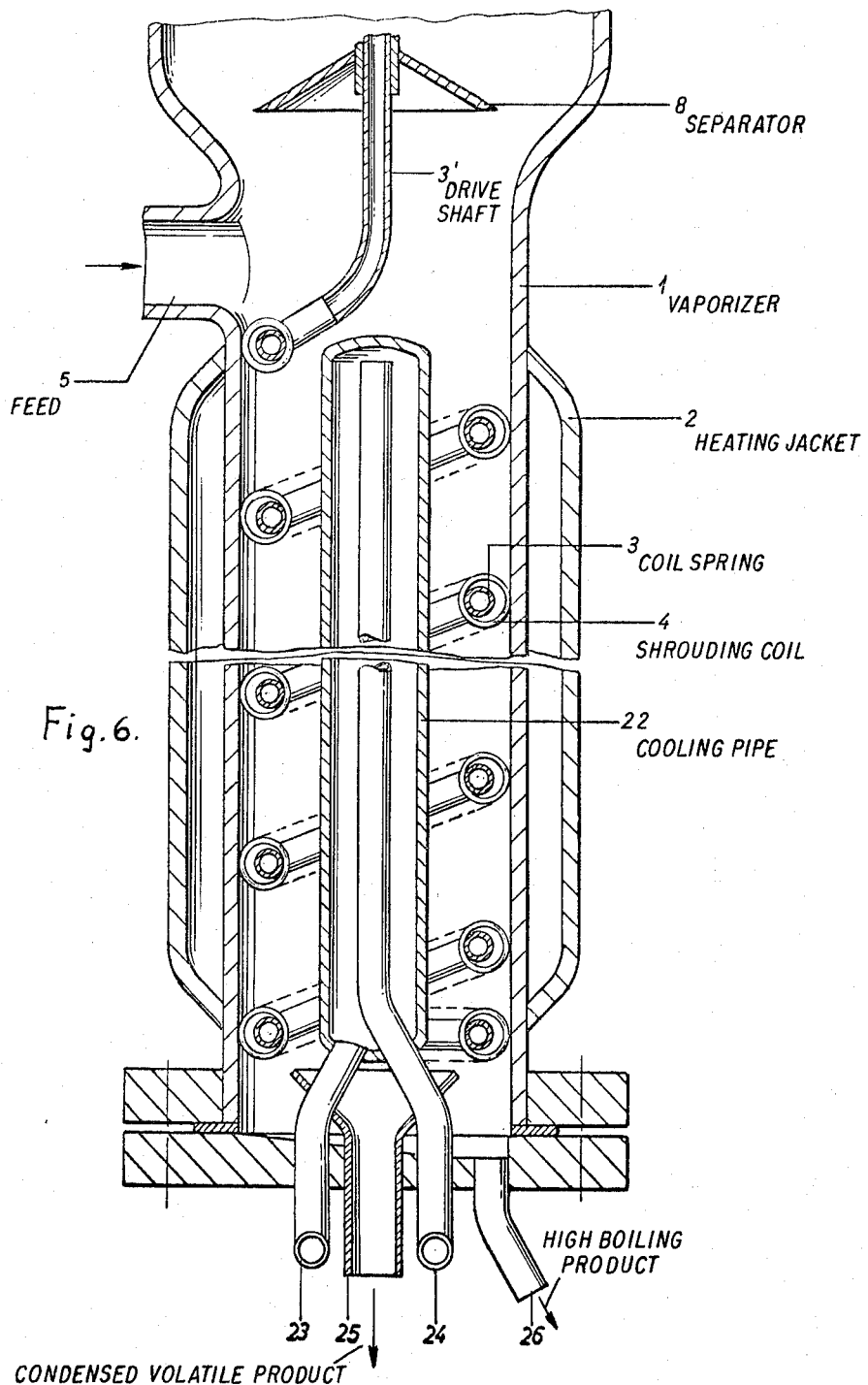
Figure 7:
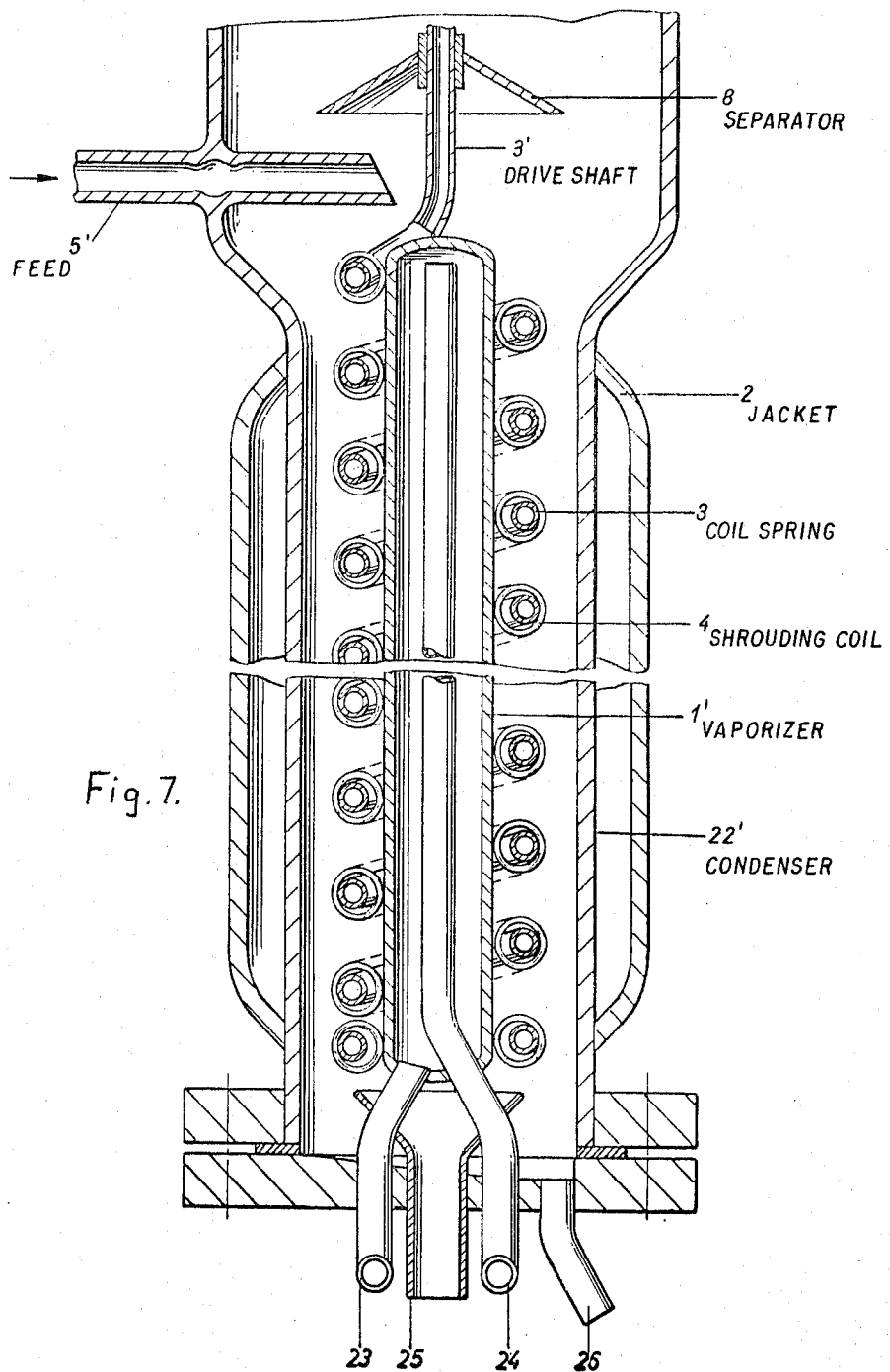

The apparatus and method of operation will be described with reference to the accompanying drawings in which:

FIG. 1 is a vertical sectional view of a thin layer vaporizer in accordance with the invention, FIGS. 2 and 3 are enlarged, broken vertical and horizontal sectional views more clearly showing the structure of the rotor, FIG. 3 being partly in section on the line 3—3 of FIG. 2 and partly in full line, FIG. 4 is a diagrammatic vertical sectional view of a thin layer vaporizer designed for upward feed and movement of the fluid, FIG. 5 is a vertical sectional view of a rectification column, FIG. 6 is a vertical sectional view of apparatus for molecular distillation with inner condensation surface, and FIG. 7 is a vertical sectional view of apparatus for molecular distillation with an inner vaporizer and outer condensation surface.

Referring to FIG. 1 the vaporizer consists of a cylindrical vaporizer tube 1 which is surrounded by a jacket 2. Within the vaporizer tube 1 there rotates a spiral rotor consisting of a supporting coil spring 3 and a thinner, shrouding coil spring 4. It will be most appropriate if the supporting coil spring 3 is designed as drive shaft 3' at the upper part of the vaporizer apparatus. The product to be distilled arrives in the thin-layer vaporizer by way of an intake 5 and is spread by the rotating body into a thin layer of film. The product having a higher boiling point is discharged through the conical pipe 6 while the vapors generated flow to the condenser (not shown) by way of pipe 7. Liquid droplets which are carried along by the vapors are thrown back to the vaporizer wall by the centrifugal separator 8 which is carried by the drive shaft 3'. In the form illustrated in FIG. 1 both of the coils 3 and 4 are formed of solid rods.

Another design of the spiral rotor is shown by FIGURES 2 and 3. In the species illustrated the supporting element has the form of a tubular supporting coil spring 3 which is elastic and flexible. The supporting coil spring 3 supports a thinner coil spring 4 formed from solid rod shrouding it in a hoselike fashion. The shrouding coil spring 4 is so shaped e.g. compressed, that it contacts the inner side of the supporting coil spring 3. In this manner there is created an elastic spring casing so that the entire rotor system 3 and 4 is located within the vaporizer tube 1 under a slight lateral compression.

The spiral rotor 3, 4 consists of an inner single strand coil 3 which may be either a solid rod as shown in FIG. 1 or a tube or pipe as shown in FIGS. 2 and 3 and an outer coil 4 formed for instance by winding a single strand of rod or wire helically around a cylindrical mandrel and causing it, as by heat treatment, to assume the shape of the mandrel, removing the resulting cylindrical coil from the mandrel and then threading it over the inner coil 3. As seen in FIGS. 1–3 the outer coil 4 is compressed over the inner coil 3 so that it bears against the inner surface of the coil 3 and extends outwardly into contact with the inner surface of the vaporizer 1. Coils 3 and 4 are both springs in the sense that if they are deformed within their elastic limits they will tend to return to their original cylindrical shapes. In the helical coil 3 the turns are separated as shown in the drawings. The coil 4 is a helix of a helical coil, the individual turns of which may be separated more or less as shown in FIGS. 2 and 3 while the turns of the helix also are separated from each other like the turns of the coil 3. As stated above the upper end of the coil 3 is straightened to form the shaft 3' which is supported by the mechanism (not shown) at the top of the tube 1 which serves to rotate the rotor 3, 4. The lower end of the coil 3 hangs free in the tube 1. The coil 4 is supported by the coil 3 e.g. it is secured at its upper end to the coil 3 as by welding and extends downwardly over the coil 3 to or near the lower end thereof with the lower end either free or secured to the coil 3. Depending upon the direction of rotation of the rotor 3, 4 and its pitch it will tend, acting as a screw, to move liquid upwardly or downwardly over the wall of the vaporizer tube 1. In the event that the coil 3 is a tube or pipe as shown in FIGS. 2 and 3 simple means (not shown) may be provided for delivering a heating or cooling fluid thereto. As stated above the lower end of the coil 4 may hang free or it may be secured to the coil 3. If coil 4 is stretched on the coil 3 it will tend to be drawn inwardly into contact with the outer surface of the coil 3 whereas if coil 4 is compressed on coil 3 it will tend to expand outwardly into contact with the inner surface of the coil 3.

The liquid delivered to the vaporizer by way of the intake 5 is spread by the spriral rotor over the wall 1 in the form of a film. Since each winding of the shouding coil spring 4 touches the vaporizer tube 1 at one line the liquid will adhere intially, due to the capillary action and the surface tension, in the wedge shaped spaces which are created at each line of contact. In case of a greater rate of feed a ring of liquid will collect within the shouding coil spring 4 and serve to replenish the layer of film. During the rotating of the spiral rotor there will occur oscillations due to the compression and the stretching of the taut spring 4 which will keep the liquid within the shouding coil spring 4 in continous motion. The film at the evaporizer tube 1 will be disturbed continously at the line of contact and thereby continously circulated and renewed.

The design of the supporting coil spring 3 in the form of a tube is particulary advantageous because it can then be heated and/or cooled. Due to the metallic contact of the shouding coil spring 4 with the heated tubular supporting coil spring 3 large quantities of heat can be transferred to the product being distilled, increasing substantially the total exchange surfaces and thereby the efficiency of the apparatus.

The design of the rotor is very advantageous in engineering respect because the rotating masses are light and are, in addition, arranged symmetrically. The supporting as well as the shouding coils are elastic and flexable, with the vaporizer tube 1 serving as a regulating guide. A mounting of the rotor at its lower end is not required even if long units are employed.

The spiral design of the rotor permits an upward or downward feed of the product to be distilled and can be arranged as desired by selection of the appropriate direction of rotation. In this manner it is possible to operate with descending or with rising film.

FIGURE 4 depicts an apparatus where the feed is in vertical direction. Its construction is identical with the thin-layer vaporizer shown by FIGURES 1, 2 and 3. A recirculation line 10 leads from the head of the vaporizer tube 1 to a heat-exchanger 11 connected to the sump 13 of the vaporizer. The product to be distilled is introduced into the recirculation line 10 by way of the pipe 9, is pre-heated in the heat-exchanger 11 and then enters the vaporizer near the bottom. The sump product with a higher boiling point is discharged from the apparatus by way of pipe 12. The direction of rotation of the spiral rotor 3, 4 and the direction of flow of the feed and recirculated liquids in the line 10 and the heat exchanger 11 are indicated by arrows.

It is possible to operate the forced-circulation vaporizer by overflow. In this case the entire system is filled with liquid up to the overflow pipe of the recirculation line 10. Due to the rotation of the rotor 3, 4 a thorough mixing and a high rate of feed are attained.

It is also possible to operate with rising film vaporization by filling the sump of the vaporizer apparatus so that only the lower two or three threads of the spiral rotor are immersed. By use of the appropriate direction of rotation the liquid is drawn up in the form of film on the heated wall by the rotating body. This method is very effective primarily in case of viscous products and is assisted further by the flow of vapor. The thickness of the film is determined mainly by the velocity of rotation and the depth of immersion of the rotor. Liquid concentrate and/or solid residue formed by the evaporation on the heated wall may fall back to the sump 13.

For maximum efficiency the rotor system, comprising the supporting coil spring 3 and the shrouding coil spring 4, can be provided with a coating (not shown) of flexible heat and chemical resistant material. For the majority of the intended uses coatings of polytetrafluoroethylene or synthetic rubber can be utilized. The shrouding coil spring 4 has the effect of a spring element pressing the coating resiliently against the surrounding wall. Obviously, this system can likewise be employed to form a film by a downwardly directed flow.

The extensive surface area of the shrouding coil spring 4 makes it possible to attain very favorable heat exchange ratios between vapor and liquid. The heat and substance exchange takes place not only in the film on the surface of the vaporizer 1 but also within the coil where a ring of liquid collects during the rotation, being renewed continuously on the surface. The pressure loss is very low because a large unobstructed profile is available for the vapor flow.

FIGURE 5 shows a column for rectification processes. The raw product to be rectified flows through pipe 14 into the vaporizer tube 1 which acts as column. The substance having a higher boiling point will reach the sump 13 of the column and is forced by a pump 15 into a vaporizer 15' (for example a downdraft vaporizer). The vapors so generated will flow upward, that is, in counterflow to the material having a higher boiling point, through the column and by way of the centrifugal separator 8 into the dephlegmator 16. By way of the baffles 17 the product arrives at the valve 18 where the distillate is removed. In accordance with the return-flow ratio one portion of the product is returned to the column by way of the control valve 19. A vacuum line is attached to pipe 20. The product having a higher boiling point is discharged from the apparatus continuously at the pump outlet 21.

FIGURE 6 shows a device for the molecular distillation with an inner condensation surface. The apparatus is designed basically in the same manner as illustrated and described above. In the center of the vaporizer tube 1 a cooling pipe 22 is installed with a cooling agent flowing through its inside. The inlet and outlet for the cooling agent are identified by numerals 23 and 24 respectively. The feed is delivered to the apparatus by way of intake 5 and is spread over the heated vaporizer tube 1 in the form of a film. The very volatile substances flow to the opposite inner condensation surface and leave the apparatus through the collecting funnel 25 as a liquid. The product having a higher boiling point collects at the bottom of the apparatus and arrives by way of the drain pipe 26 in the storage receptacle (not illustrated).

FIGURE 7 illustrates a molecular still with inner vaporizer 1' and outer condensation surface 22'. The shrouding coil spring 4 is anchored at its upper and lower ends to coil 3 and is placed under such tension i.e. stretched, so that it will contact the outer surface of the supporting coil spring 3 as well as the outside of the vaporizer tube 1'. The system is again designed resiliently because the shrouding coil 4 is able to yield outwardly.

The rate of rotation of the spiral rotor 3, 4 is relatively slow and the centrifugal force generated by the rotation is not sufficient to overcome the elasticity of the coils 3 and 4 and cause them to swing outwardly away from the wall of the vaporizer 1'. The liquid to be vaporized is delivered by the feed pipe 5' directly on to the surface of the vaporizer 1' where it is spread and agitated by contact with the shrouding coil 4. Otherwise the apparatus of FIG. 7 operates similarly to the embodiments illustrated in FIGS. 1–6.

Generally, the compounds of high molecular weight which are to be distilled will have a sufficient lubricating property so that the shrouding coil 4 which touches the wall can be made from a metallic material, for example chromium nickel spring steel. However, it will be expedient to coat the spring steel with a coating of wear-resistant plastic (not shown), for example polytetrafluoroethylene in order to eliminate any abrasion.

Obviously, the rotor can be designed in various forms and arranged, for example, in a conical or horizontally placed vaporizer apparatus. It is also possible to encase the shrouding coil 4 by an additional coil so that a multiple-encased coil system is created. Obviously, it is also possible to replace the coils by other resilient systems such as metallic tubes.

I claim:

1. A heat-exchange apparatus comprising a vaporizer tube of circular cross-section having a heat exchange surface, means for supplying liquid to said surface, means for supplying heat to said surface and a spiral rotor mounted to move in contact with said surface, said spiral rotor comprising a resilient shrouding coil and a resilient supporting coil loosely disposed within said shrouding coil, said shrouding and supporting coils being wound in a helix disposed adjacent to said heat exchange surface, the said helix being mounted for rotation about the axis of said heat exchange surface.

2. Apparatus as defined in claim 1 in which said rotor is within said vaporizer tube and said shrouding coil engages the inner surface of said tube and the inner side of said supporting coil.

3. Apparatus as defined in claim 1 in which said rotor surrounds said vaporizer tube and said shrouding coil engages the outer surface of said vaporizer tube and the outer side of said supporting coil.

4. Apparatus as defined in claim 1 in which said supporting coil is in the form of a solid rod.

5. Apparatus as defined in claim 1 in which said supporting coil is in the form of a tube.

References Cited by the Examiner

UNITED STATES PATENTS

| 858,663 | 7/1907 | Liebscher | 15—104.1 |
| 1,885,402 | 11/1932 | Angelucci | 159—5 X |
| 2,158,577 | 5/1939 | Haley | 15—104.1 |
| 2,182,680 | 12/1939 | Rugget et al. | 15—104.1 X |
| 2,544,154 | 3/1951 | Hampton. | |

FOREIGN PATENTS

| 1,085,290 | 7/1960 | Germany. |
| 1,121,587 | 1/1962 | Germany. |
| 1,136,982 | 9/1962 | Germany. |

NORMAN YUDKOFF, *Primary Examiner.*

J. SOFER, *Assistant Examiner.*